United States Patent
Wang et al.

(10) Patent No.: US 7,026,362 B2
(45) Date of Patent: *Apr. 11, 2006

(54) SOL-GEL PROCESS UTILIZING REDUCED MIXING TEMPERATURES

(75) Inventors: Shiho Wang, Lake Forest, CA (US); Yasar Halefoglu, Aliso Viejo, CA (US); Chih-hsing Cheng, Fullerton, CA (US); Dengfeng Xu, Irvine, CA (US); David Kwong Nung Chan, Fountain Valley, CA (US); Meng-ying Chen, Taipei (TW); Chinh Do, Westminster, CA (US)

(73) Assignee: Simax Technologies, Inc., Irvine, CA (US)

( * ) Notice: Subject to any disclaimer, the term of this patent is extended or adjusted under 35 U.S.C. 154(b) by 448 days.

This patent is subject to a terminal disclaimer.

(21) Appl. No.: 09/974,725

(22) Filed: Oct. 9, 2001

(65) Prior Publication Data

US 2003/0069122 A1  Apr. 10, 2003

(51) Int. Cl.
  *C01B 33/152*  (2006.01)
  *C03C 3/00*  (2006.01)

(52) U.S. Cl. .......................... 516/111; 516/98; 65/17.2; 65/395; 501/12; 423/338; 428/312.6

(58) Field of Classification Search .................. 65/17.2, 65/395; 501/12; 516/111, 98; 423/338, 423/312.6; 428/312.6
  See application file for complete search history.

(56) References Cited

U.S. PATENT DOCUMENTS

| | | | |
|---|---|---|---|
| 2,092,163 A | 9/1937 | Johnson | |
| 2,441,422 A | 5/1948 | Krieble et al. | |
| 2,794,002 A | 5/1957 | Haensel et al. | |
| 3,850,971 A | 11/1974 | Termin et al. | |
| 4,104,363 A | 8/1978 | Vozka et al. | 423/338 |
| 4,477,580 A | 10/1984 | Fleming, Jr. | 501/12 |
| 4,707,174 A | 11/1987 | Johnson, Jr. et al. | 65/395 |
| 4,752,459 A | 6/1988 | Pepper | 423/338 |
| 4,765,818 A * | 8/1988 | Che et al. | 65/395 |
| 4,775,401 A | 10/1988 | Fleming et al. | 65/395 |
| 4,810,674 A | 3/1989 | Che et al. | 501/12 |
| 4,822,136 A | 4/1989 | Hicks, Jr. | 385/142 |
| 4,840,653 A | 6/1989 | Rabinovich | 65/395 |
| 4,849,378 A | 7/1989 | Hench et al. | |
| 4,851,150 A | 7/1989 | Hench et al. | |
| 4,851,373 A | 7/1989 | Hench et al. | 501/12 |
| 5,023,208 A | 6/1991 | Pope et al. | 501/12 |
| 5,071,674 A | 12/1991 | Nogues et al. | 427/57 |
| 5,074,633 A | 12/1991 | Cohen et al. | 385/43 |
| 5,076,980 A | 12/1991 | Nogues et al. | 264/65 |
| 5,123,940 A | 6/1992 | DiGiovanni et al. | 501/12 |
| 5,134,107 A * | 7/1992 | Narula | 502/303 |
| 5,182,236 A | 1/1993 | Caldwell et al. | 501/12 |
| 5,185,020 A | 2/1993 | Satoh et al. | 65/404 |
| 5,196,382 A | 3/1993 | Hench et al. | 501/12 |
| 5,236,483 A | 8/1993 | Miyashita et al. | 65/17.2 |
| 5,243,769 A | 9/1993 | Wang et al. | 34/27 |
| 5,254,508 A | 10/1993 | Kirkbir et al. | 65/395 |
| 5,264,197 A | 11/1993 | Wang et al. | 423/338 |
| 5,314,520 A | 5/1994 | Yagi et al. | 264/1.21 |
| 5,343,633 A | 9/1994 | Wang et al. | 34/92 |
| 5,380,510 A | 1/1995 | Matsui et al. | 423/338 |
| 5,494,863 A | 2/1996 | Mathur | |
| 5,871,558 A | 2/1999 | Takei et al. | 65/17.2 |
| 5,895,770 A | 4/1999 | Pullukat et al. | 502/103 |
| 6,209,357 B1 | 4/2001 | Bhandarkar et al. | 65/395 |
| 6,442,977 B1 | 9/2002 | Bhandarkar et al. | 65/395 |
| 6,732,549 B1 | 5/2004 | Lum et al. | 65/384 |
| 2003/0078153 A1* | 4/2003 | Wang et al. | 501/12 |
| 2003/0147605 A1* | 8/2003 | Wang et al. | 385/123 |
| 2003/0147606 A1* | 8/2003 | Wang et al. | 385/123 |
| 2003/0210881 A1 | 11/2003 | Mendoza e tal. | 385/132 |

FOREIGN PATENT DOCUMENTS

| | | | |
|---|---|---|---|
| JP | 59-30730 | 2/1984 | |
| JP | 59-30730 A | 2/1984 | 423/338 |
| WO | PCT/US02/02707 | 6/2002 | |

OTHER PUBLICATIONS

Kirkbir, et al., "Parametric study of strength of silica gels," Journal Non-Crystalline Solids, vol. 178, p. 284-292 (1994).

Murata, Hideaki, et al., *Drying and sintering of large SiO2 monoliths*, SPIE, vol. 2288 Sol-Gel Optics III, pp. 709-716 (1994).

Brinker & Scherer, "Sol-Gel Science, The Physics and Chemistry of Sol-Gel Processing," Academic Press, 1990 pp. 483-498.

Shibata, Shuichi, et al., *Fabrication of Fluorine-Doped Silica Glasses by the Sol-Gel Method*, Journal of Non-Crystalline Solids, vol. 100 (1988), pp. 269-273, month unknown.

* cited by examiner

Primary Examiner—Daniel S. Metzmaier
(74) Attorney, Agent, or Firm—Knobbe, Martens, Olson & Bear, LLP

(57) ABSTRACT

A method of forming a gel monolith includes preparing a first solution comprising metal alkoxide and preparing a second solution comprising a catalyst. A third solution is prepared by mixing the first solution and the second solution together. At least one of the first, second, and third solutions is cooled to achieve a mixture temperature for the third solution which is substantially below room temperature, wherein the third solution has a significantly longer gelation time at the mixture temperature as compared to a room temperature gelation time for the third solution. The method further includes allowing the third solution to gel, thereby forming the gel monolith.

36 Claims, 9 Drawing Sheets

SOL-GEL PROCESS UTILIZING REDUCED MIXING TEMPERATURES

BACKGROUND OF THE INVENTION

1. Field of the Invention

This invention relates to a sol-gel process for fabricating glass and ceramic monoliths with selected properties (e.g., chemical purity, homogeneity) compatible with a variety of applications, including high-performance optics.

2. Description of the Related Art

High-performance oxide-based materials are increasingly in demand for use in a variety of applications. For example, silica glass has the optical transmittance, mechanical hardness, chemical durability, thermal stability, low thermal expansion, and high laser damage threshold which make it an optimal material for applications such as optoelectronic laser diodes, fiber optic telecommunications, medical laser delivery systems, and military optical sensors. There is significant pressure on material manufacturers to find fabrication techniques which can satisfy the increasingly stringent performance requirements for silica glass and other oxide-based materials.

Numerous techniques are currently in use for the fabrication of glasses or ceramics. For example, silica glasses have traditionally been manufactured by melting natural quartz or synthetic silica in crucibles at high temperatures (typically about 1700° C.–2000° C.). However, the resultant materials have limited utility for various optical applications, primarily due to structural inhomogeneities as well as impurity concentrations (e.g., from intrinsic impurities in the raw materials, incomplete chemical reactions of components, and contamination by the crucible). Such high-temperature processes are also unsuitable for manufacturing products with certain compositions, tailored dopant or additive gradients, organic or high vapor pressure additives, or additives in their metallic or partially reduced states.

Another more recent technique for manufacturing silica glasses has been chemical vapor deposition (CVD), in which silicon-containing chemical vapors are combined with oxygen under high temperature conditions to deposit silica onto a substrate. However, the resultant materials are relatively expensive due to low material collection efficiencies, slow processing rates, and complex processing and pollution control equipment. Furthermore, CVD processes lack the versatility for fabricating more compositionally complex glasses.

Sol-gel technology has been used to fabricate products which satisfy some or all of the desired performance requirements without the difficulties or limitations found in more conventional fabrication techniques. A typical sol-gel silica process involves the transition of a liquid colloidal solution "sol" phase into a solid porous "gel" phase, followed by drying and sintering the resulting gel monolith at elevated temperatures to form silica glass. One method of preparing a silica porous gel monolith is to pour into a mold a solution of silica-forming compounds (e.g., silicon alkoxides), solvents, and catalysts, which then undergoes hydrolysis and polymerization, resulting in a wet porous gel monolith or matrix. After drying the wet gel monolith in a controlled environment to remove the fluid from the pores, the dry gel monolith is densified into a solid glass-phase monolith.

Sol-gel technology can yield products with the desired chemical purity, homogeneity, and flexibility in compositions, dopants, and dopant profiles. However, the potential for sol-gel processes for fabricating large monoliths has been limited by various problems. Large gel monoliths can take a long time to dry, thereby limiting the product throughput. But even more importantly, shrinkage of the gel monolith during the drying process often results in cracking, especially in larger gel monoliths.

As outlined by Pope, et al. in U.S. Pat. No. 5,023,208 and Wang, et al. in U.S. Pat. No. 5,264,197, both of which are incorporated by reference herein, this resultant cracking of gel monoliths during the drying step of the fabrication process is believed to result from stresses due to capillary forces in the gel pores. Numerous techniques for reducing this cracking have been proposed, and many of these efforts have focused on increasing the pore sizes of the gel monolith to reduce the capillary stresses generated during drying. Pope, et al. discloses subjecting the gel to a hydrothermal aging treatment which causes silica particles to migrate and fill small pores in the porous gel matrix, thereby increasing the average pore size. Wang, et al. discloses adjusting the relative concentrations of an alcohol diluent and/or one or more catalysts such as HCl or HF, which has the effect of increasing the average pore radius of the resulting dry gel. HF catalyzed gels generally have larger pore sizes than gels catalyzed by other catalysts such as HCl, $HNO_3$, $H_2SO_4$, or oxalic acid.

SUMMARY OF THE INVENTION

According to one aspect of the present invention, a method of forming a gel monolith comprises preparing a first solution comprising metal alkoxide and preparing a second solution comprising a catalyst. A third solution is prepared by mixing the first solution and the second solution together. At least one of the first, second, and third solutions is cooled to achieve a mixture temperature for the third solution which is substantially below room temperature, wherein the third solution has a significantly longer gelation time at the mixture temperature as compared to a room temperature gelation time for the third solution. The third solution is allowed to gel, thereby forming the gel monolith.

In another aspect of the present invention, a method of processing a solution comprising a catalyst, water, and metal alkoxide comprises extending a gelation time of the solution by keeping the solution at a predetermined temperature substantially below room temperature.

In yet another aspect of the present invention, a solution for a gel monolith comprises a catalyst with a concentration greater than approximately 3 mole % of the solution.

In yet another aspect of the present invention, a method of preparing a solution for forming a gel monolith comprises providing a first solution comprising metal alkoxide. The method further comprises providing a second solution comprising a catalyst. The method further comprises mixing the first solution and the second solution together to form a third solution. The method further comprises cooling at least one of the first, second, and third solutions to achieve a mixture temperature for the third solution which is substantially below room temperature. The third solution has a significantly longer gelation time at the mixture temperature as compared to a room temperature gelation time for the third solution.

In a further aspect of the present invention, a monolith has a mean pore size of at least 300 Å and a standard deviation from such mean of less than approximately 50 Å.

BRIEF DESCRIPTION OF THE DRAWINGS

These and other aspects of the present invention will be apparent to the skilled artisan from the following detailed description read in conjunction with the appended drawings, which are meant to illustrate, and not to limit, the invention, and in which.

DETAILED DESCRIPTION OF THE PREFERRED EMBODIMENT

Figure 1:
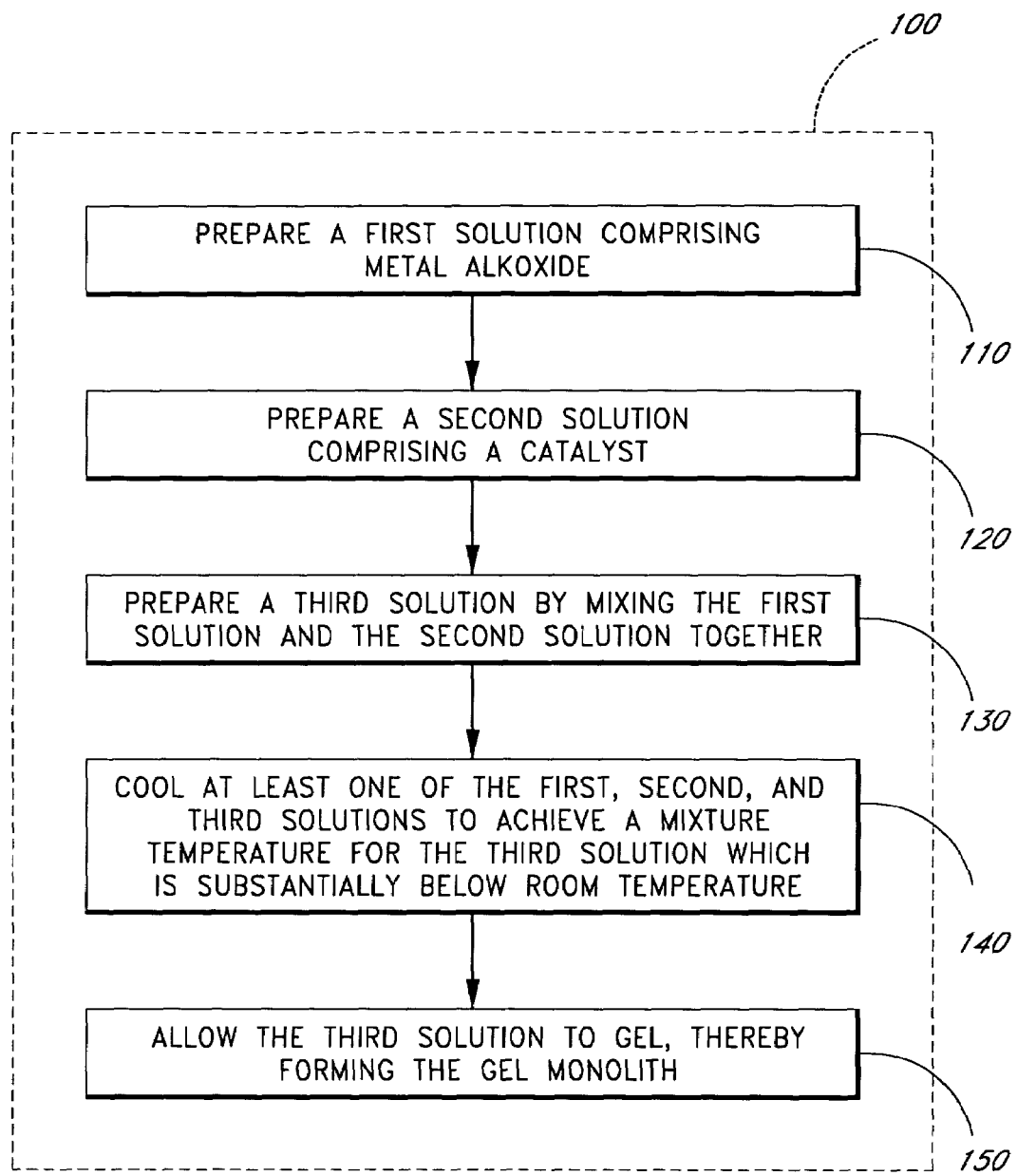
FIG. 1 is a flow diagram of a method of forming a gel monolith in accordance with an embodiment of the present invention.

During the drying of a large gel monolith, the gel monolith shrinks in size, and capillary forces in the gel ports arise as the liquid content of the gel monolith is reduced. The tendency of gel monoliths to develop cracks is dependent on these capillary forces. For example, U.S. patent application Ser. No. 09/615,628 by Wang, et al. (which issued as U.S. Pat. No. 6,620,368 on Sep. 16, 2003), entitled "Sol-Gel Process for Production of Oxide-Based Glass and Ceramic Articles," which is incorporated by reference herein, discloses a process that reduces the influence of these forces. The process comprises removing liquid from the pores of the gel monolith such that the outer region of the gel monolith is not dried before the inner region of the gel monolith is dried, thereby avoiding inhomogeneities in the capillary forces which cause stresses and cracking of the gel monolith.

Because the magnitude of the capillary forces is a function of the sizes of the pores in the gel monolith, the tendency for cracking of gel monoliths may be reduced by tailoring the gel microstructure so as to produce gel monoliths with larger pore sizes. The microstructure of a gel monolith is influenced by the rates of hydrolysis and of polymerization which occur simultaneously during the gelation of the wet gel monolith from the sol. For example, in the case of a silica-based sol in which tetraethylorthosilicate or TEOS $((C_2H_5O)_4Si)$ is mixed with deionized water, a diluent or solvent such as ethyl alcohol or ethanol $(C_2H_5OH)$, and a catalyst such as HF or ammonia, hydrolysis occurs with the following reaction: $(C_2H_5O)_4Si + 4H_2O \rightarrow 4C_2H_5OH + Si(OH)_4$. The $Si(OH)_4$ molecules polymerize, resulting in a network of SiO2 and water. Numerous factors influence the kinetics of hydrolysis and polymerization, including the type and concentration of any catalysts and the temperature. The influence of the catalyst concentration on the pore sizes of the resultant gel monoliths is illustrated by Want, et al. in U.S. Pat. No. 5,264,197. Wang, et al. disclose that increasing the HF catalyst concentration, while maintaining constant concentrations of other constituents of the sol, results in an increase in the average pore radius of the resulting dry gel.

Catalysts such as HF or ammonia increase the rate of hydrolysis and polymerization. If the catalyst concentration is too high, the hydrolysis and polymerization reactions are so fast that the gelation time is extremely short, and in certain circumstances can be nearly instantaneous. Gelation time as used herein is defined as the time from the moment a sol comprising water and a silicon-containing material such as TEOS is prepared to the moment the sol forms a gel which does not flow. Very short gelation times do not provide sufficient time to allow a prepared sol to be poured into molds for casting, eventual gelation, and further processing. In addition, bubbles which form during the gelation process may not have an opportunity to diffuse out of the gel if the gelation time is short, thereby degrading the quality of the resulting gel. Furthermore, higher temperatures have the effect of shortening the gelation time even further.

FIG. 1 is a flow diagram of a method 100 of forming a gel monolith in accordance with an embodiment of the present invention. While the flow diagram of FIG. 1 illustrates a particular embodiment with steps in a particular order, other embodiments with different orders of steps are also included in the present invention.

In the embodiment described in FIG. 1, in an operational block 110, a first solution 10 is prepared, the first solution 10 comprising metal alkoxide. Examples of metal alkoxides compatible with embodiments of the present invention include, but are not limited to, silicon alkoxides (such as tetramethylorthosilicate (TMOS) or tetraethylorthosilicate (TEOS)), germanium alkoxides (such as tetraethylorthogermanium (TEOG)), aluminum alkoxides, zirconium alkoxides, and titanium alkoxides. In certain embodiments, the first solution 10 comprises more than one metal alkoxide (e.g., both TEOS and TEOG). In certain embodiments, the first solution 10 further comprises a solvent. Examples of solvents include, but are not limited to, ethyl alcohol, methyl alcohol, or other alcohols.

In an operational block 120, a second solution 20 is prepared, the second solution 20 comprising a catalyst. Examples of catalysts include, but are not limited to, hydrofluoric acid (HF) and ammonia $(NH_3)$. In certain embodiments, the second solution 20 further comprises a solvent, examples of which include, but are not limited to ethyl alcohol, methyl alcohol, or other alcohols.

In an operational block 130, a third solution 30 is prepared by mixing the first solution 10 and the second solution 20 together. While in certain embodiments, the second solution 20 further comprises water, in other embodiments, water is added to the third solution 30 such that the third solution 30 thereby comprises water and metal alkoxide. The third solution 30 can then begin to undergo the hydrolysis and polymerization reactions which form the gel. The presence of the catalyst in the third solution 30 accelerates the formation of the gel (i.e., reduces the gelation time of the third solution 30 as compared to the gelation time without the catalyst) as described above. In an operational block 140, at least one of the first solution 10, second solution 20, and third solution 30 is cooled to achieve a mixture temperature for the third solution which is substantially below room temperature. In certain embodiments, only the third solution 30 is cooled to achieve a mixture temperature which is substantially below room temperature. Such a mixture temperature serves to decelerate the formation of the gel, such that the third solution 30 has a significantly longer gelation time at the mixture temperature as compared to a room temperature gelation time for the third solution 30. In this way, cooling the third solution 30 to the mixture temperature makes it possible to increase the catalyst concentration in the third solution 30 while reducing the problematic effects associated with higher catalyst concentrations. In an operational block 150, the third solution 30 is allowed to gel, thereby forming the gel monolith.

Figure 2:
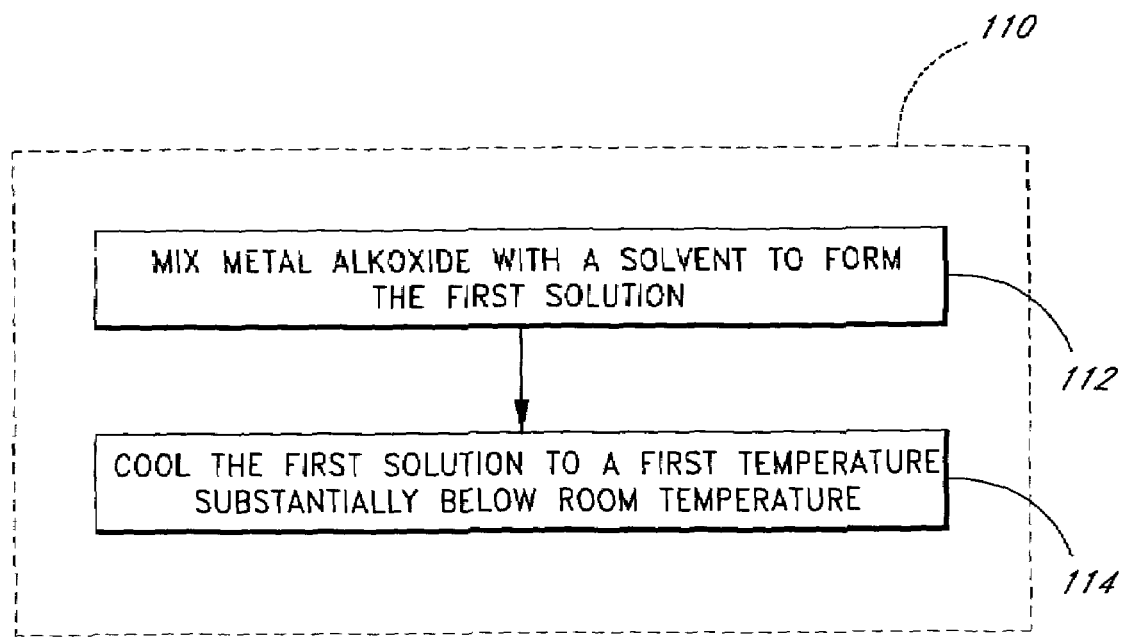
FIG. 2 is a flow diagram corresponding to another embodiment of the present invention in which the first solution is formed by mixing metal alkoxide with a solvent and cooling the first solution.

In certain embodiments, as illustrated in the flow diagram of FIG. 2, preparing 110 the first solution 10 comprises an operational block 112 in which metal alkoxide is mixed with a solvent to form the first solution 10 and an operational block 114 in which the first solution 10 is cooled to a first temperature substantially below room temperature. While FIG. 2 illustrates a particular embodiment in which mixing 112 occurs before cooling 114, in other embodiments one or both of the mixed constituents of the first solution 10 (i.e., the metal alkoxide and the solvent) can be cooled before or while being mixed together to form the first solution 10.

Figure 3A:
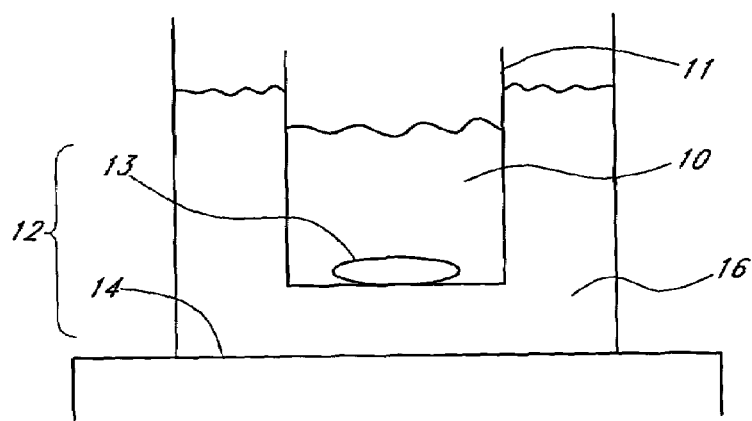
FIGS. 3A–3F schematically illustrate various embodiments of the present invention in which the first solution is mixed and cooled.
Figure 3B:
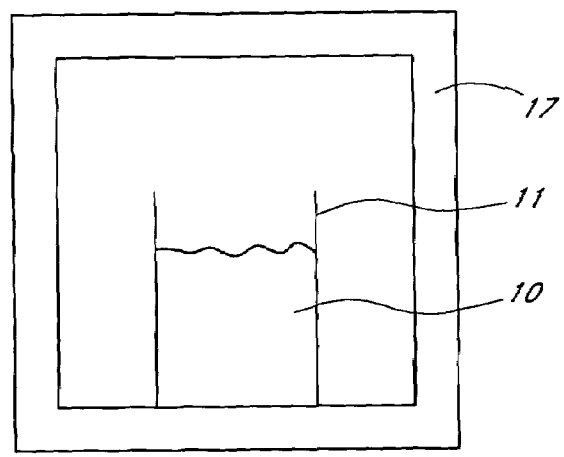
Figure 3C:
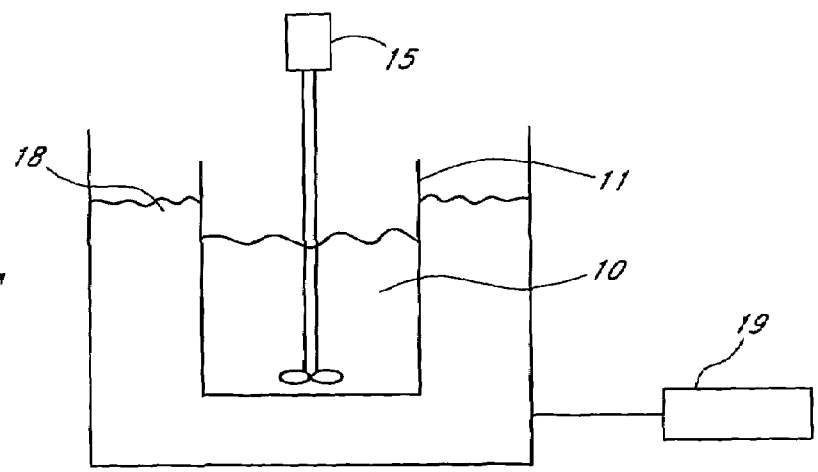

In certain embodiments, mixing 112 the metal alkoxide with the solvent is achieved by pouring both constituents of the first solution 10 into a first vessel 11. In other embodiments, a mixing system 12 is used to agitate the first solution 10 to ensure sufficiently homogeneous mixing of the metal alkoxide and the solvent. Examples of mixing systems 12 in accordance with embodiments of the present invention include, but are not limited to, magnetic stirrers, mechanical stirrers, static mixers, or other mechanisms to agitate the first solution 10. In the embodiment schematically illustrated in FIG. 3A, the mixing system 12 comprises a magnetic stirrer which includes a stir bar 13 comprising a ferromagnetic material and a magnetic driver 14 coupled to the stir bar 13. Upon activation, the magnetic driver 14 generates magnetic forces to spin the stir bar 13 within the first solution 10 for a predetermined period of time. In other embodiments, as schematically illustrated in FIG. 3C (discussed more fully below), the mixing system 12 comprises a mechanical stirrer 15 which is inserted into the first solution 10, activated to agitate the first solution 10 for a predetermined period of time, then removed from the first solution 10.

In certain embodiments, the first temperature is preferably approximately equal to or less than 0° C., more preferably approximately equal to or less than –10° C., still more preferably approximately equal to or less than –25° C., and most preferably approximately equal to or less than –40° C. In certain embodiments in which the first temperature is approximately equal to or less than 0° C., the first solution 10 can be cooled in a first vessel 11 placed in an ice bath 16 comprising a mixture of water and ice, as schematically illustrated in FIG. 3A. In still other embodiments, the first solution 10 can be cooled in a first vessel 11 contained within a refrigerator 17, as schematically illustrated in FIG. 3B. One example of a refrigerator 17 compatible with embodiments of the present invention is an Isotemp General Purpose Lab Refrigerator available from Fisher Scientific International of Hampton, N.H.

Figure 3D:
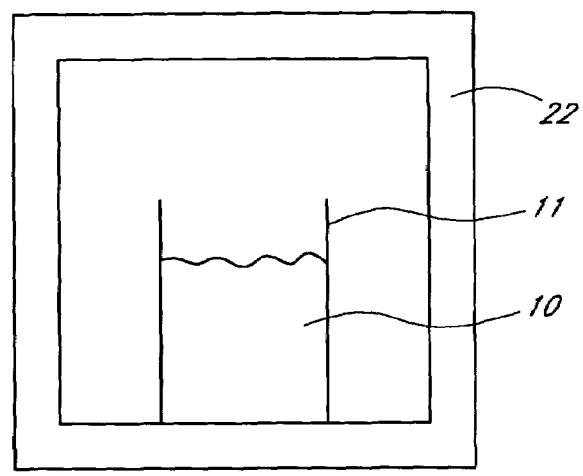

In certain embodiments in which the first temperature is approximately equal to or less than –10° C., the first solution 10 can be cooled in a first vessel 11 placed in a glycol bath 18 comprising a mixture of propylene glycol or ethylene glycol and water, typically in approximately equal proportions. In certain embodiments, as schematically illustrated in FIG. 3C, the glycol bath 18 is coupled to a chiller 19 which removes heat from the glycol bath 18 to maintain the desired first temperature. One example of a chiller 19 compatible with embodiments of the present invention is an RTE-140 Low Temperature Bath Circulator from Thermo Neslab of Portsmouth, N.H. In other embodiments in which the first temperature is approximately equal to or less than –25° C., the first solution 10 can be cooled in a first vessel 11 contained within a freezer 22, as schematically illustrated in FIG. 3D. One example of a freezer 22 compatible with embodiments of the present invention is an Isotemp General Purpose Lab Freezer available from Fisher Scientific International of Hampton, N.H.

Figure 3E:
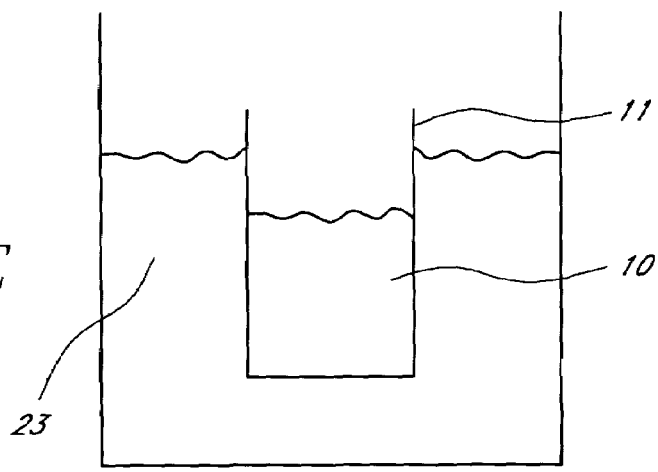
Figure 3F:
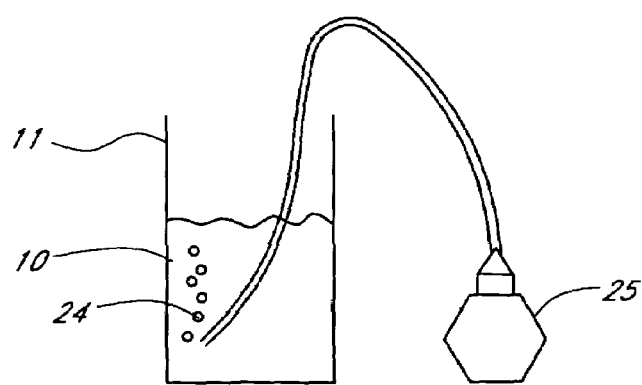

In certain embodiments in which the first temperature is approximately equal to or less than –40° C., the first solution 10 can be cooled in a first vessel 11 placed in a dry ice bath 23 comprising a mixture of dry ice ($CO_2$), propylene glycol or ethylene glycol, and water, as schematically illustrated in FIG. 3E. Typically, the dry ice bath 23 comprises equal amounts of propylene glycol or ethylene glycol, and water, and a sufficient amount of dry ice to reduce the temperature of the dry ice bath 23 to the desired level. In other embodiments, the first solution 10 can be cooled by bubbling nitrogen vapor 24 from a liquid nitrogen reservoir 25 through the first solution 10, as schematically illustrated in FIG. 3F.

Figure 4:
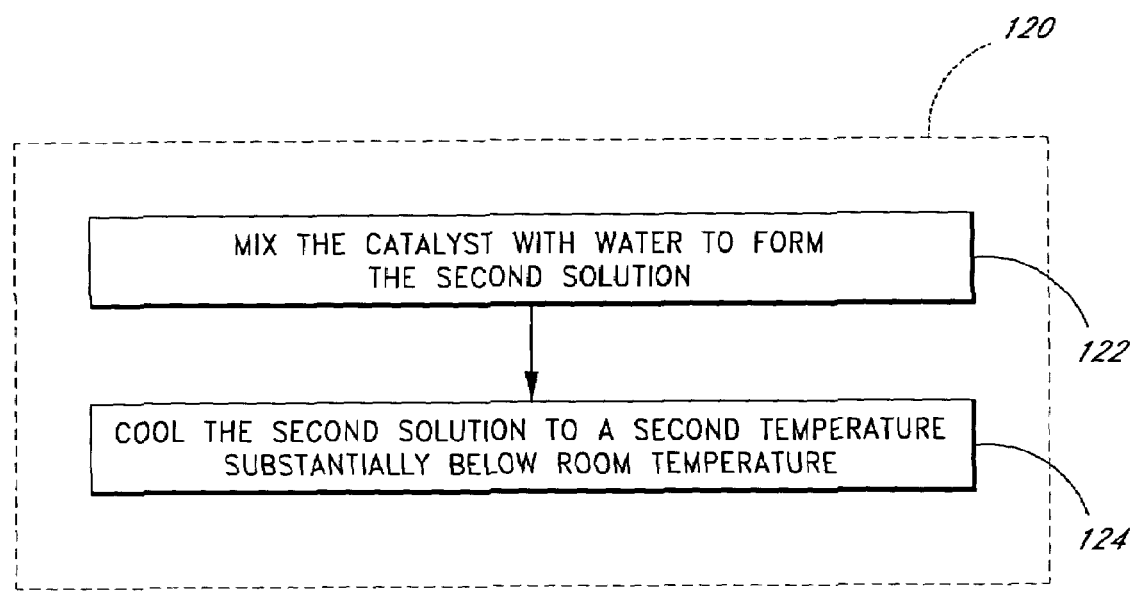
FIG. 4 is a flow diagram corresponding to another embodiment of the present invention in which the second solution is formed by mixing the catalyst with water and cooling the second solution.

As illustrated in the flow diagram of FIG. 4, in certain embodiments, preparing 120 the second solution 20 comprises an operational block 122 in which the catalyst is mixed with water to form the second solution 20 and an operational block 124 in which the second solution 20 is cooled to a second temperature substantially below room temperature. While FIG. 4 illustrates a particular embodiment in which mixing 122 occurs before cooling 124, in other embodiments one or both of the mixed constituents of the second solution 20 (i.e., the catalyst and the water) are cooled before or while being mixed together.

In certain embodiments, mixing 122 the catalyst with water is achieved by pouring both constituents of the second solution 20 into a second vessel. Similarly to the mixing 112 of the metal alkoxide with the solvent to form the first solution 10, in other embodiments, a stirring system can be used to agitate the second solution 20 to ensure sufficiently homogeneous mixing of the catalyst and water. Examples of stirring systems in accordance with embodiments of the present invention include, but are not limited to, magnetic stirrers, mechanical stirrers, static mixers, or other mechanisms to agitate the second solution 20.

In certain embodiments, the second temperature is preferably approximately equal to or less than 0° C., more preferably approximately equal to or less than –10° C., still more preferably approximately equal to or less than –25° C., and most preferably approximately equal to or less than –40° C. In certain embodiments in which the second temperature is approximately equal to or less than 0° C., the second solution 20 can be cooled in the second vessel placed in an ice bath 16 or contained in a refrigerator 17, as described above in relation to the cooling of the first solution 10. Similarly, in embodiments in which the second temperature is approximately equal to or less than –10° C., a glycol bath 18 and chiller 19 can be used, in embodiments in which the second temperature is approximately equal to or less than –25° C., a freezer 22 can be used, and in embodiments in which the second temperature is approximately equal to or less than –40° C., a dry ice bath 23 can be used. In addition, in other embodiments, the second solution 20 can be cooled by bubbling nitrogen vapor 24 from a liquid nitrogen reservoir 25 through the second solution 20.

Figure 5:
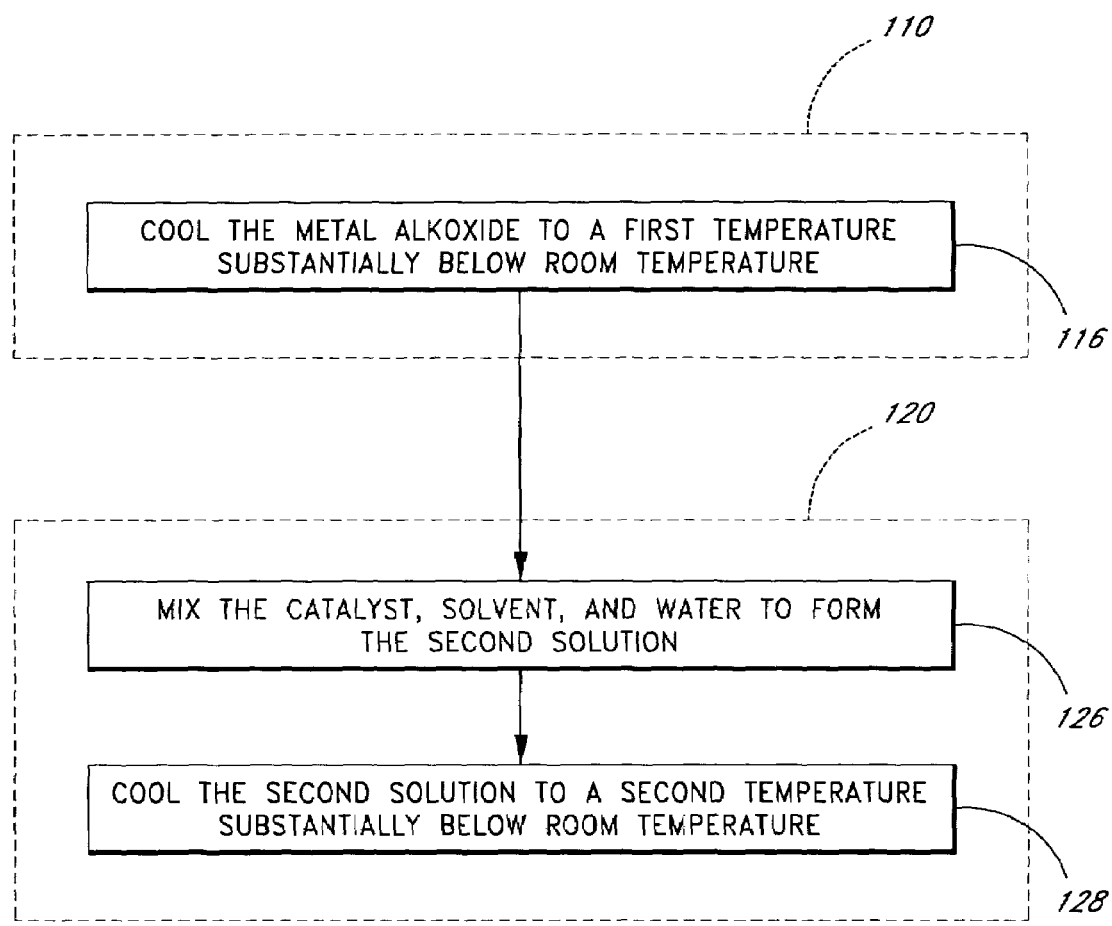
FIG. 5 is a flow diagram corresponding to another embodiment of the present invention in which the metal alkoxide is cooled to a first temperature, the second solution is formed by mixing the catalyst, solvent, and water, and cooling the second solution.

In certain embodiments, the first solution 10 can comprise metal alkoxide and the second solution 20 can comprise the catalyst, solvent, and water. In such an embodiment, as illustrated in the flow diagram of FIG. 5, preparing 110 the first solution 10 comprises cooling the metal alkoxide to a first temperature substantially below room temperature in an operational block 116. In such an embodiment, preparing 120 the second solution 20 comprises mixing the catalyst, solvent, and water to form the second solution 20 in an operational block 126, and cooling the second solution 20 to a second temperature substantially below room temperature in an operational block 128. Embodiments such as that illustrated in FIG. 5 avoid having the water freeze which would inhibit sufficient mixing and further processing of the gel monolith, for example in embodiments in which the second temperature is approximately equal to or less than −25° C. Other embodiments for preparing the first solution 10 and second solution 20 include other procedures for cooling the first solution 10 and second solution 20 without freezing any of the constituents.

Figure 6:
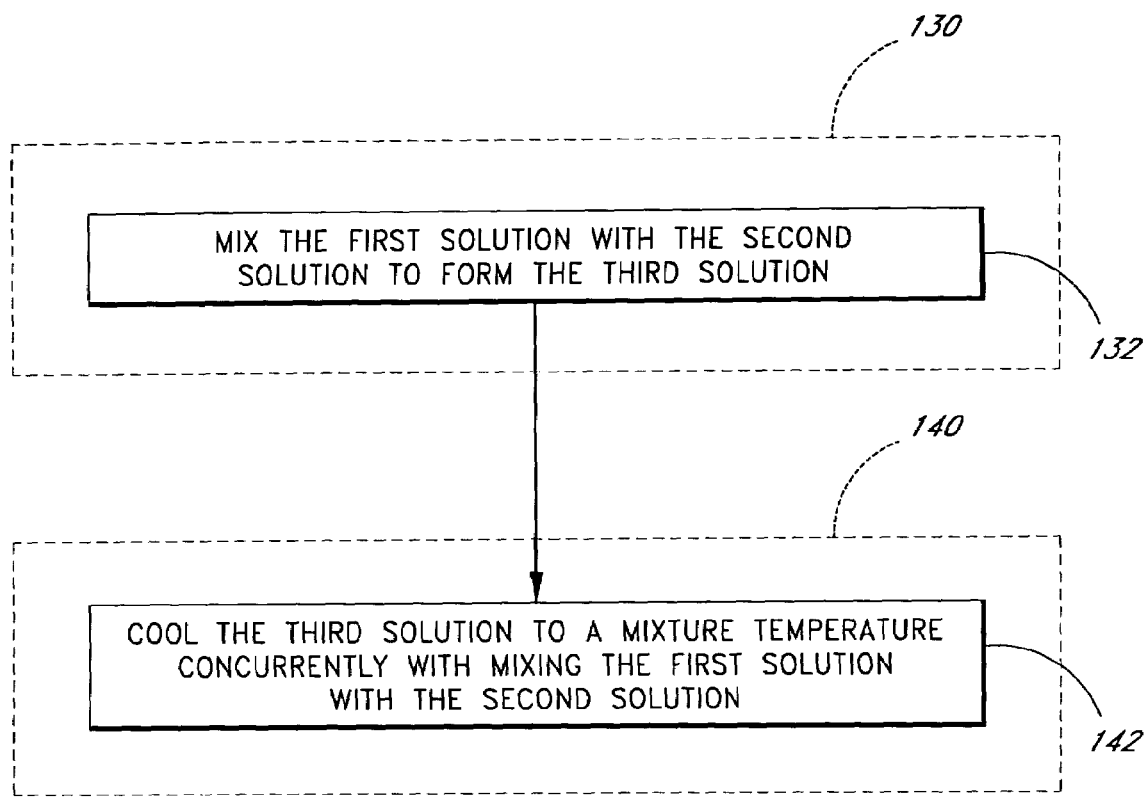
FIG. 6 is a flow diagram corresponding to another embodiment of the present invention in which the third solution is formed by mixing the first solution and the second solution, and cooling the third solution.

As illustrated in the flow diagram of FIG. 6, in certain embodiments, preparing 130 the third solution 30 comprises an operational block 132 in which the first solution 10 is mixed with the second solution 20 to form the third solution 30. In certain embodiments, mixing 132 the first solution 10 and second solution 20 is achieved by pouring both solutions 10, 20 into a third vessel 55. Alternatively in other embodiments, the first solution 10 is maintained at a temperature substantially below room temperature while being transferred to the third vessel 55 via a material measurement system 60.

Figure 7:
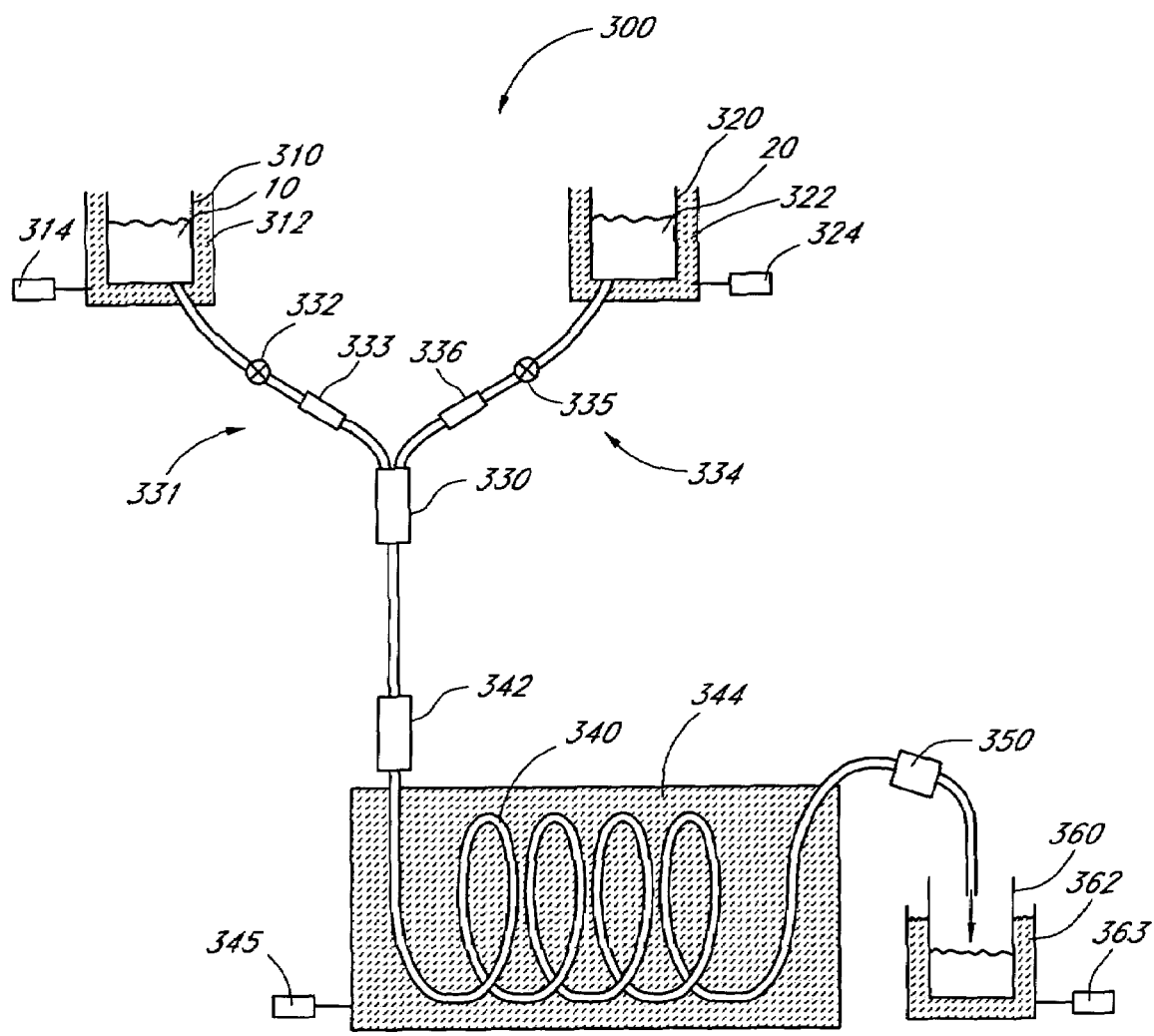
FIG. 7 schematically illustrates a mixing station in accordance with embodiments of the present invention.

As schematically illustrated in FIG. 7, the material measurement system 60 of certain embodiments comprises an input valve 62, a measuring vessel 64, a scale 66, and an output valve 68. In certain embodiments, the input valve 62 is adjustable and coupled to a proportional-integral-differential (PID) controller (not shown) to control the flow of the first solution 10 into the measuring vessel 64. The scale 66 of certain embodiments is a weight scale which provides a measure of the amount of the first solution 10 in the measuring vessel 64. The output valve 68 of certain embodiments is coupled to a solenoid (not shown) which opens and closes the output valve 68 in response to signals. In certain embodiments, the second solution 20 is transferred to the third vessel 55 via a second material measurement system 70. The second material measurement system 70 can be similar to the material measurement system 60 for the first solution 10, i.e., comprising a second input valve 72, a second measuring vessel 74, a second scale 76, and a second output valve 78, as schematically illustrated in FIG. 7. Other embodiments of the material measurement system 60 do not comprise a scale 66 or a second scale 76.

Similarly to the mixing 112 of the metal alkoxide with the solvent to form the first solution 10, in other embodiments, a stirring system can be used to agitate the third solution 30 to ensure sufficiently homogeneous mixing of the first solution 10 and second solution 20. Examples of stirring systems in accordance with embodiments of the present invention include, but are not limited to, magnetic stirrers, mechanical stirrers, static mixers, or other mechanisms to agitate the third solution 30.

At least one of the first solution 10, second solution 20, and third solution 30 is cooled 140 to achieve a mixture temperature for the third solution 30 which is substantially below room temperature. As illustrated in an operational block 142 of FIG. 6, in certain embodiments, the third solution 30 is cooled 142 to the mixture temperature concurrently with mixing 132 the first solution 10 with the second solution 20. In the embodiment schematically illustrated in FIG. 7, the third vessel 55 is in a glycol bath 18 coupled to a chiller 19 to maintain the third solution 30 at a temperature substantially below room temperature during mixing. While FIG. 6 illustrates a particular embodiment in which mixing 132 occurs concurrently with cooling 142, in other embodiments cooling 140 the third solution 30 occurs after mixing 132, or one or both of the mixed constituents of the third solution 30 (i.e., the first solution 10 or the second solution 20) are cooled before being mixed together.

Once the first solution 10 and the second solution 20 are mixed together, the metal alkoxide of the first solution 10 and the water of the second solution 20 begin to undergo exothermic hydrolysis and polymerization reactions which result in the formation of the gel monolith. The presence of a catalyst, such as HF, increases the reaction rates of these hydrolysis and polymerization reactions, thereby reducing the gelation time. With the temperature of the third solution 30 increasing due to the exothermic reactions, the reaction rates of these reactions increase even further, thereby reducing the gelation time even further. As described above, due to the combination of high catalyst concentrations and increased heat from the exothermic reactions, the hydrolysis and polymerization reaction rates can become too fast (i.e., the gelation time is too short) to allow sufficient processing of the gel monolith resulting from the third solution 30. Therefore, in embodiments of the present invention in which the third solution 30 comprises a catalyst, the third solution 30 is cooled 142 to a mixture temperature substantially below room temperature concurrently with the mixing 132 to reduce the heat available to the hydrolysis and polymerization reactions and to slow down the kinetics of these reactions. At the mixture temperature, the third solution 30 has a longer gelation time as compared to its gelation time at room temperature.

In certain embodiments, the mixture temperature is preferably approximately equal to or less than 0° C., more preferably approximately equal to or less than −10° C., still more preferably approximately equal to or less than −25° C., and most preferably approximately equal to or less than −40° C. In certain other embodiments, the third solution 30 is cooled to a mixture temperature at which the gelation time of the third solution 30 is increased by at least ten times as compared to the gelation time of the third solution 30 at room temperature. In certain embodiments in which the mixture temperature is approximately equal to or less than 0° C., the third solution 30 can be cooled using an ice bath 16 or a refrigerator 17, as described above in relation to the cooling of the first solution 10. Similarly, in embodiments in which the mixture temperature is approximately equal to or less than −10° C., a glycol bath 18 and chiller 19 can be used, in embodiments in which the mixture temperature is approximately equal to or less than −25° C., a freezer 22 can be used, and in embodiments in which the mixture temperature is approximately equal to or less than −40° C., a dry ice bath 23 can be used. In addition, in other embodiments, the third solution 30 can be cooled by bubbling nitrogen vapor 24 from a liquid nitrogen reservoir 25 through the third solution 30.

In certain embodiments, the third solution 30 is allowed to gel, thereby forming the gel monolith, as illustrated in the operational block 150 of the flow diagram of FIG. 1. The cooled third solution 30 is poured into a mold 75 in certain embodiments, where the hydrolysis and polymerization reactions are allowed to continue so that the third solution 30 gels into the gel monolith. In certain other embodiments, the third solution 30 is prepared by mixing the first solution 10 and second solution 20 in the mold 75, and cooling the third solution 30 in the mold 75 while the third solution 30 continues to gel to form the gel monolith.

In still other embodiments, as schematically illustrated in FIG. 7, the third solution 30 is transferred from the third vessel into a series of molds 75 at approximately 20° C. via cooled pumps 80 and cooled filters 90. In certain embodiments, the pumps 80 are either cooled or insulated to prevent the temperatures of the third solution 30 from increasing while flowing to the molds 75. One example of a pump 80 compatible with embodiments of the present invention is Type Number UND1.300TT.18, available from KNF Neuberger, Inc. of Trenton, N.J.

The filters 90 remove particles from the third solution 30 which would degrade the quality of the resultant gel monolith. These particles can be contaminants or can be due to pre-gelling of small amounts of the third solution 30. In certain embodiments, each filter 90 comprises multiple filters, which can be chosen to remove particles within certain size ranges. For example, a filter 90 can comprise a 0.6 μm filter connected in series with a 0.1 μm filter. In certain embodiments, the filters 90 are cooled or insulated to prevent the temperatures of the third solution 30 from increasing while flowing therethrough. Exemplary filters 90 compatible with embodiments of the present invention are available from Millipore Corporation of Bedford, Mass.

Figure 8:
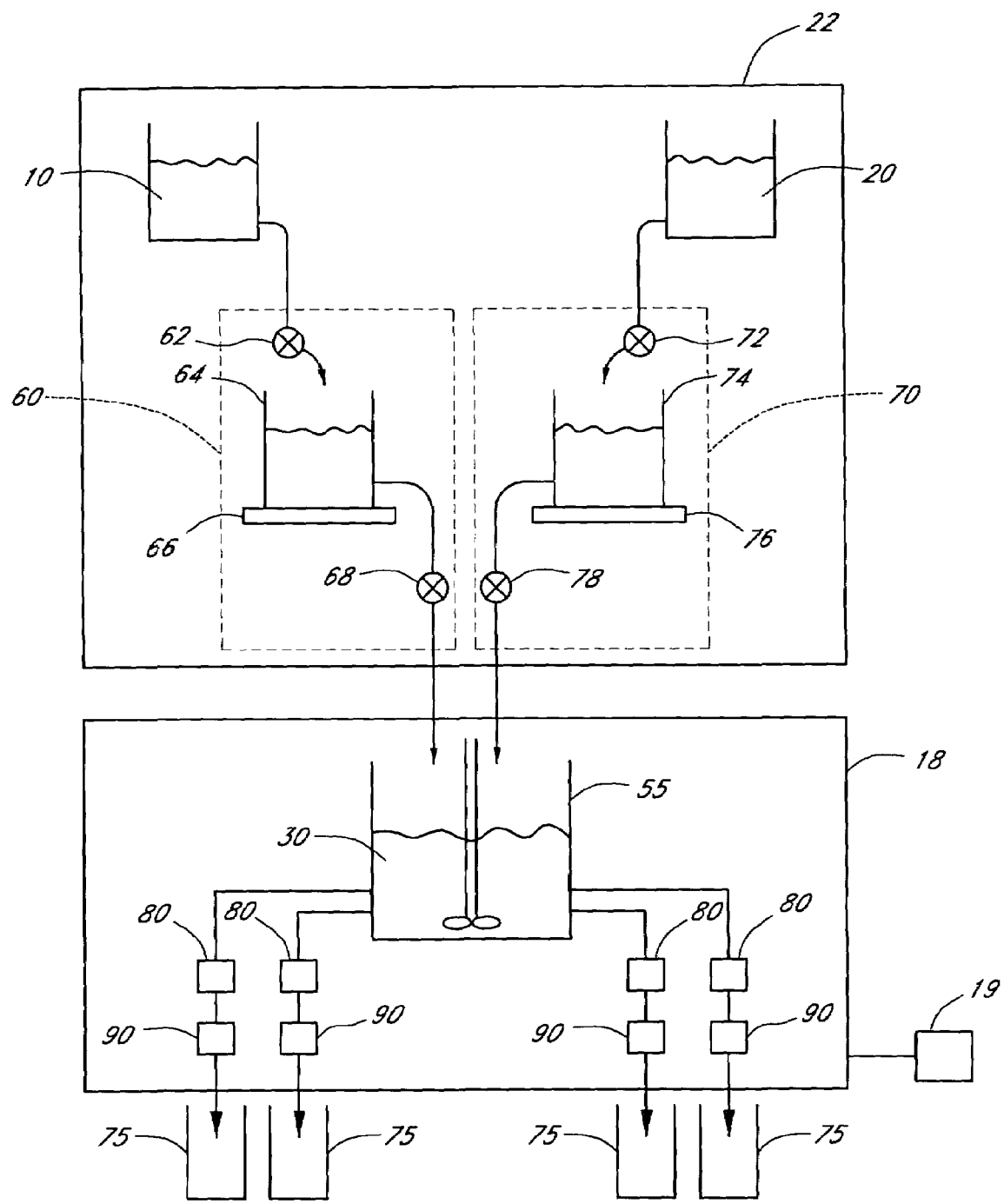
FIG. 8 schematically illustrates an alternative mixing station in accordance with embodiments of the present invention.

FIG. 8 schematically illustrates a mixing station 300 compatible with embodiments of the present invention in which the first solution 10 and second solution 20 are each prepared in a first vessel 310 and second vessel 320, respectively. In the embodiment schematically illustrated in FIG. 8, the first vessel 310 is cooled by a first glycol bath 312 which is maintained at a first temperature by a chiller 314. Similarly, the second vessel 320 is cooled by a second glycol bath 322 which is maintained at a second temperature by a chiller 324. In certain other embodiments, the first temperature and second temperature are approximately equal, and the first solution 10 and second solution 20 are cooled to the same temperature by a single bath. In addition, as described above, other types of baths or cooling procedures to reduce the temperatures of the first solution 10 and second solution 20 are in accordance with embodiments of the present invention.

In certain embodiments, the first vessel 310 is coupled to a static mixer 330 via a first fluid conduit 331 comprising a first valve 332 and a first pump 333, and the second vessel 320 is coupled to the static mixer 330 via a second fluid conduit 334 comprising a second valve 335 and a second pump 336. As schematically illustrated in FIG. 8, the first solution 10 is pumped through the first fluid conduit 331 from the first vessel 310 by the first pump 333 upon opening the first valve 332. Similarly, the second solution 20 is pumped through the second fluid conduit 334 from the second vessel 320 by the second pump 336 upon opening the second valve 335. In certain embodiments, the first fluid conduit 331 and second fluid conduit 334 are either cooled or insulated to prevent the temperatures of either the first solution 10 or second solution 20 from increasing while flowing to the static mixer 330.

Certain embodiments comprise an in-line static mixer 330, as schematically illustrated in FIG. 8, which has various mixing elements to generate vortices as the fluid flows through the static mixer 330, thereby providing an efficient mixing of the fluids flowing therethrough. Exemplary static mixers 330 compatible with embodiments of the present invention are available from Cole-Parmer Instrument Company of Vernon Hills, Ill. In certain embodiments, the static mixer 330 is either cooled or insulated to prevent the temperature of the third solution 30 from increasing while being mixed in the static mixer 330.

In the embodiment schematically illustrated in FIG. 8, the mixing station 300 further comprises a cooling coil 340 coupled to the static mixer 330 via a third pump 342. In certain embodiments, the cooling coil 340 is a thin-walled tube placed in a third glycol bath 344 which is coupled to a third chiller 345. The thin walls of the cooling coil 340 permit heat transfer from the third solution 30 to the third glycol bath 344, thereby achieving a mixture temperature for the third solution 30 substantially below room temperature. In addition, as described above, other types of baths or cooling procedures to reduce the mixture temperature of the third solution 30 are in accordance with embodiments of the present invention.

In the embodiment schematically illustrated in FIG. 8, the mixing station 300 comprise a filter 350 coupled to the cooling coil 340. In certain embodiments, the filter 350 comprises multiple filters, which can be chosen to remove particles within certain size ranges. For example, the filter 350 can comprise a 0.6 μm filter connected in series with a 0.1 μm filter. In certain embodiments, the filter 350 is cooled or insulated to prevent the temperatures of the third solution 30 from increasing while flowing therethrough. Exemplary filters 350 compatible with embodiments of the present invention are available from Millipore Corporation of Bedford, Mass.

In the embodiment schematically illustrated in FIG. 8, the third solution 30 flows through the filter 350 to the mold 360, which is in a fourth glycol bath 362 coupled to a fourth chiller 363. Alternatively in other embodiments, the mold 360 is at approximately room temperature. Once in the mold 360, the third solution 30 is permitted to gel, thereby forming the gel monolith. In addition, as described above, other types of baths or cooling procedures to reduce the temperature of the third solution 30 are in accordance with embodiments of the present invention.

In certain other embodiments, because of the corrosive nature of the constituents of the third solution 30 (e.g., the hydrogen fluoride catalyst), some or all of the components of the mixing station 300 have their internal portions coated with a protective material. Examples of protective materials in accordance with embodiments of the present invention include, but are not limited to, Teflon® available from E. I. DuPont de Nemours & Co. of Wilmington, Del. or Kynar® available from Elf Atochem North America of Philadelphia, Pa.

In certain other embodiments, some or all of the valves, pumps, and chillers are controlled by a control system comprising a microprocessor. In response to user input, the control system can regulate the timing and duration of the flow of the first solution 10, second solution 20, and third solution 30, as well as the temperatures of these solutions.

By preparing the third solution 30 at a mixture temperature substantially below room temperature, embodiments of the present invention allow higher percentages of catalyst in the third solution 30 without having gelation times which inhibit further processing of the gel monolith. For example, the gelation time for a third solution 30 comprising approximately 3.7 mole % of HF at room temperature is on the order of 100 to 200 seconds. Typically, a gelation time greater than approximately 5 minutes is required to pour the third solution 30 into a mold and to permit bubbles to diffuse out of the third solution 30, thereby avoiding difficulties in the processing of the gel monolith. When processing larger quantities of solution (e.g., during production runs), the time required to process the solution can be even longer. However, by preparing the same third solution 30 comprising approximately 3.7 mole % of HF at −14° C., the gelation time is on the order of 10 to 30 minutes. By preparing the third solution 30 at −40° C., the third solution 30 can comprise approximately 10 mole % of HF before the gelation time is shortened to 10 minutes.

As described above, higher percentages of the catalyst result in larger pore sizes in the resultant gel monolith, thereby reducing the capillary stresses generated during drying of the gel monolith. For example, a third solution 30 comprising approximately 3.7 mole % of HF results in a gel monolith with pore sizes of approximately 500 Å, while a third solution 30 comprising approximately 7.4 mole % of HF results in a gel monolith with pore sizes of approximately 1150 Å.

In certain embodiments, the third solution 30 comprises preferably greater than approximately 3 mole % of a catalyst, more preferably greater than 5 mole % of a catalyst, and most preferably greater than 10 mole % of a catalyst. In certain embodiments, the third solution 30 comprising greater than approximately 3 mole % of the catalyst is cooled to have a gelation time greater than approximately five minutes. In certain other embodiments, the third solution 30 comprising greater than approximately 3 mole % of a catalyst is cooled to have a gelation time greater than one hour. In still other embodiments, the third solution 30 comprising greater than approximately 3 mole % of a catalyst is cooled to have a gelation time greater than two hours.

Monoliths produced using chemical-vapor deposition techniques typically have pore size distributions which range from approximately 1000 Å to 2000 Å (i.e., with standard deviations of approximately 500 Å). In certain embodiments, the third solution 30 can result in gel monoliths with pore size distributions with mean pore sizes of approximately 1000 Å, but with smaller standard deviations than those obtained using chemical-vapor deposition techniques. In certain embodiments, the resultant gel monolith comprises a distribution of pore sizes having a mean pore size of at least 300 Å and a standard deviation of less than approximately 50 Å.

In an exemplary embodiment, a first solution 10 comprising approximately 900 grams of TEOS, approximately 117 grams of TEOG, and approximately 440 grams of ethanol is prepared and stored in a freezer 22 at a temperature of approximately −30° C. for approximately 10 hours. A second solution 20 comprising approximately 110 grams of ethanol, approximately 165 grams of water, and approximately 50 grams of HF is also prepared and stored in the freezer 22 at a temperature of approximately −30° C. for approximately 10 hours. The first solution 10 and the second solution 20 are then mixed together using a magnetic stirrer in a vessel in a glycol bath 18 coupled to a chiller 19 whereby the temperature of the resultant third solution 30 is maintained between approximately −10° C. and −15° C. After mixing for approximately five minutes, the third solution 30 is pumped into a mold 75 through a filter 80 comprising a 0.6 µm filter and a 0.1 µm filter. The mold 75 is then moved to a flat and safe area at approximately room temperature where the third solution 30 sits and forms a gel monolith. After the third solution 30 forms the gel monolith, ethanol is poured onto the gel monolith to prevent cracking due to the reaction heat generated inside the gel monolith body. All the steps of this exemplary embodiment are performed in a class 1000 or better clean room environment in which the temperature is maintained at approximately 68° F. and the humidity is between approximately 35% and 55%.

Although described above in connection with particular embodiments of the present invention, it should be understood the descriptions of the embodiments are illustrative of the invention and are not intended to be limiting. Various modifications and applications may occur to those skilled in the art without departing from the true spirit and scope of the invention as defined in the appended claims.

What is claimed is:

1. A method of processing a solution comprising a catalyst of metal alkoxide hydrolysis and polymerization, water, and metal alkoxide, the solution having a catalyst concentration greater than 3 mole percent of the solution, the method comprising extending a gelation time of the solution by keeping the solution at a predetermined temperature approximately equal to or less than zero degrees Celsius.

2. The method of claim 1, wherein the predetermined temperature is approximately equal to or less than −10 degrees Celsius.

3. A method of preparing a solution for forming a gel monolith, the method comprising:
   providing a first solution comprising metal alkoxide;
   providing a second solution comprising a catalyst of metal alkoxide hydrolysis and polymerization;
   mixing the first solution and the second solution together to form a third solution, the third solution having a catalyst concentration greater than 3 mole percent of the third solution; and
   cooling at least one of the first, second, and third solutions to achieve a mixture temperature for the third solution which is approximately equal to or less than zero degrees Celsius, wherein the third solution has a significantly longer gelation time at the mixture temperature as compared to a room temperature gelation time for the third solution.

4. A method of forming a gel monolith, the method comprising:
   preparing a first solution comprising metal alkoxide;
   preparing a second solution comprising a catalyst of metal alkoxide hydrolysis and polymerization;
   preparing a third solution by mixing the first solution and the second solution together, the third solution having a catalyst concentration greater than 3 mole percent of the third solution;
   cooling at least one of the first, second, and third solutions to achieve a mixture temperature for the third solution which is approximately equal to or less than zero degrees Celsius, wherein the third solution has a significantly longer gelation time at the mixture temperature as compared to a room temperature gelation time for the third solution; and
   allowing the third solution to gel, thereby forming the gel monolith.

5. The method of claim 4, wherein the metal alkoxide comprises tetramethylorthosilicate (TMOS).

6. The method of claim 5, wherein the metal alkoxide further comprises tetraethylorthogermanium (TEOG).

7. The method of claim 4, wherein the metal alkoxide comprises tetraethylorthosilicate (TEOS).

8. The method of claim 7, wherein the metal alkoxide further comprises tetraethylorthogermanium (TEOG).

9. The method of claim 4, wherein the first solution further comprises a solvent.

10. The method of claim 9, wherein the solvent comprises alcohol.

11. The method of claim 4, wherein the catalyst comprises hydrofluoric acid.

12. The method of claim 4, wherein the catalyst comprises ammonia.

13. The method of claim 4, wherein the second solution further comprises water.

14. The method of claim 4, wherein the second solution further comprises hydrochloric acid.

15. The method of claim 4, wherein the second solution further comprises a solvent.

16. The method of claim 1, wherein cooling at least one of the first, second, and third solutions comprises cooling the third solution while mixing the first solution and second solution.

17. The method of claim 4, wherein cooling at least one of the first, second, and third solutions comprises cooling the third solution after mixing of the first solution and second solution.

18. The method of claim 4, wherein cooling at least one of the first, second, and third solutions comprises cooling the first solution before mixing the first solution and second solution.

19. The method of claim 4, wherein cooling at least one of the first, second, and third solutions comprises cooling the second solution before mixing the first solution and second solution.

20. The method of claim 4, wherein the mixture temperature is approximately equal to or less than −10 degrees Celsius.

21. The method of claim 4, wherein the mixture temperature is approximately equal to or less than −40 degrees Celsius.

22. The method of claim 4, wherein preparing the first solution comprises cooling the first solution.

23. The method of claim 4, wherein preparing the first solution comprises mixing the metal alkoxide with a solvent and cooling the first solution.

24. The method of claim 4, wherein preparing the second solution comprises cooling the second solution.

25. The method of claim 4, wherein preparing the second solution comprises mixing the catalyst with water and cooling the second solution.

26. The method of claim 4, wherein preparing the third solution comprises mixing the first solution and the second solution together in a third vessel.

27. The method of claim 26, wherein the third vessel comprises a static mixer.

28. The method of claim 26, wherein the third vessel is in an ice bath to cool the third solution.

29. The method of claim 26, wherein the third vessel is in a refrigerator to cool the third solution.

30. The method of claim 26, wherein the third vessel is in a glycol bath comprising propylene glycol and water to cool the third solution.

31. The method of claim 30, wherein the glycol bath is coupled to a chiller.

32. The method of claim 26, wherein the third vessel is in a glycol bath comprising ethylene glycol and water to cool the third solution.

33. The method of claim 26, wherein the third vessel is in a freezer to cool the third solution.

34. The method of claim 26, wherein the third vessel is in a dry ice bath comprising dry ice, propylene glycol, and water to cool the third solution.

35. The method of claim 26, wherein the third vessel is in a dry ice bath comprising dry ice, ethylene glycol, and water to cool the third solution.

36. The method of claim 4, wherein cooling the third solution comprises bubbling nitrogen vapor from a liquid nitrogen reservoir through the third solution.

* * * * *

UNITED STATES PATENT AND TRADEMARK OFFICE
CERTIFICATE OF CORRECTION

| | | |
|---|---|---|
| PATENT NO. | : 7,026,362 B2 | Page 1 of 1 |
| APPLICATION NO. | : 09/974725 | |
| DATED | : April 11, 2006 | |
| INVENTOR(S) | : Shiho Wang et al. | |

It is certified that error appears in the above-identified patent and that said Letters Patent is hereby corrected as shown below:

On the Title Page, Col. 2 (U.S. Patent Documents), Line 21, delete "Mendoza e tal." and insert -- Mendoza et al. --.

On the Title Page, Col. 2 (Other Publications), Line 2, delete "P." and insert -- pp. --.

On the Title Page, Col. 2 (Other Publications), Lind 3, delete "SiO2" and insert -- $SiO_2$ --.

In Col. 3, line 37, delete "ports" and insert -- pores --.

In Col. 3, line 62, delete "HE" and insert -- HF --.

In Col. 4, line 3, delete "Want" and insert -- Wang --.

In Col. 13, line 11, delete "claim 1" and insert -- claim 4 --.

Signed and Sealed this

Thirty-first Day of October, 2006

JON W. DUDAS
*Director of the United States Patent and Trademark Office*